(12) United States Patent
Tamura et al.

(10) Patent No.: US 10,738,527 B2
(45) Date of Patent: Aug. 11, 2020

(54) VEHICLE DOOR OPENING/CLOSING DEVICE

(71) Applicant: Honda Access Corp., Niiza-shi, Saitama (JP)

(72) Inventors: Yasuhiro Tamura, Niiza (JP); Ryoichi Enoki, Niiza (JP); Shoji Yokoyama, Niiza (JP); Jun Sugimoto, Niiza (JP); Tatsuya Tachibana, Niiza (JP)

(73) Assignee: HONDA ACCESS CORP., Niiza-shi, Saitama (JP)

( * ) Notice: Subject to any disclaimer, the term of this patent is extended or adjusted under 35 U.S.C. 154(b) by 153 days.

(21) Appl. No.: 15/940,137

(22) Filed: Mar. 29, 2018

(65) Prior Publication Data
US 2018/0283081 A1 Oct. 4, 2018

(30) Foreign Application Priority Data

Mar. 31, 2017 (JP) .................. 2017-070110

(51) Int. Cl.
*E05F 15/73* (2015.01)
*E05F 15/76* (2015.01)
*B60R 25/20* (2013.01)

(52) U.S. Cl.
CPC .......... *E05F 15/73* (2015.01); *B60R 25/2054* (2013.01); *E05F 15/76* (2015.01); *E05Y 2400/858* (2013.01); *E05Y 2900/531* (2013.01)

(58) Field of Classification Search
CPC ...... E05F 15/73; E05F 15/76; B60R 25/2054; E05Y 2900/531; E05Y 2400/858
See application file for complete search history.

(56) References Cited

U.S. PATENT DOCUMENTS

| 9,982,473 B2 * | 5/2018 | Herthan ............... B60R 25/2054 |
| 2006/0164029 A1 * | 7/2006 | Suzuki ..................... E05F 15/42 |
| | | 318/283 |

(Continued)

FOREIGN PATENT DOCUMENTS

| JP | 2007-162459 A | 6/2007 |
| JP | 2007-284958 A | 11/2007 |

(Continued)

OTHER PUBLICATIONS

Office Action dated Aug. 28, 2018, issued in counterpart Japanese Application No. 2017-070110, with English translation. (6 pages).

(Continued)

*Primary Examiner* — Justin B Rephann
(74) *Attorney, Agent, or Firm* — Westerman, Hattori, Daniels & Adrian, LLP

(57) ABSTRACT

A vehicle door opening/closing device includes a front door configured to open and close a front left opening of a vehicle body, a rear sliding door configured to open and close a rear left opening of the vehicle body, a vehicle door opening/closing device main body configured to automatically open and close the rear sliding door, a detection unit configured to detect the presence of the left foot of a user, and a control unit (detection ECU, door lock ECU, sliding door driving ECU). If the front door is in an opened state at the time when the detection unit detects the presence of the left foot, the control unit does not put the rear sliding door into a closed state.

2 Claims, 8 Drawing Sheets

(56) References Cited

U.S. PATENT DOCUMENTS

| | | | |
|---|---|---|---|
| 2007/0132552 A1* | 6/2007 | Kurpinski | B60R 25/2036 340/5.72 |
| 2012/0319502 A1* | 12/2012 | Van Gastel | E05F 15/73 307/116 |
| 2015/0025751 A1* | 1/2015 | Sugiura | B60J 5/06 701/49 |
| 2016/0026191 A1* | 1/2016 | Fujimoto | B60J 5/00 701/49 |
| 2016/0251891 A1* | 9/2016 | Herthan | B60R 25/2054 49/31 |
| 2017/0130509 A1* | 5/2017 | Sugiura | B60R 25/2054 |
| 2017/0232932 A1* | 8/2017 | Nishidai | B60R 25/23 340/5.61 |
| 2017/0241187 A1* | 8/2017 | Takayanagi | E05F 15/632 |
| 2017/0357246 A1* | 12/2017 | Herthan | B60R 25/2054 |
| 2018/0065545 A1* | 3/2018 | McMahon | E05F 15/73 |
| 2018/0283081 A1 | 10/2018 | Tamura et al. | |
| 2019/0010749 A1* | 1/2019 | Sugiura | E05F 15/73 |

FOREIGN PATENT DOCUMENTS

| | | |
|---|---|---|
| JP | 2012-172367 A | 9/2012 |
| JP | 2015-21237 A | 2/2015 |

OTHER PUBLICATIONS

Office Action dated Dec. 4, 2018, issued in counterpart Japanese Application No. 2017-070110, with English translation (7 pages).
Office Action dated Sep. 3, 2019, issued in counterpart JP Application No. 2018-203119, with English translation. (8 pages).

* cited by examiner

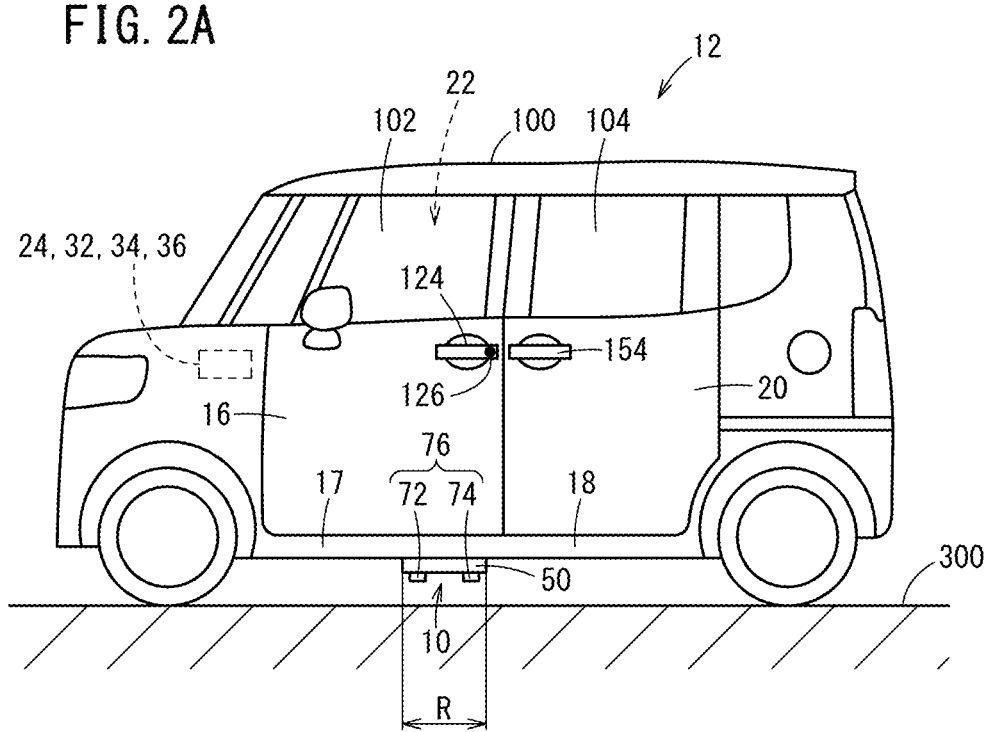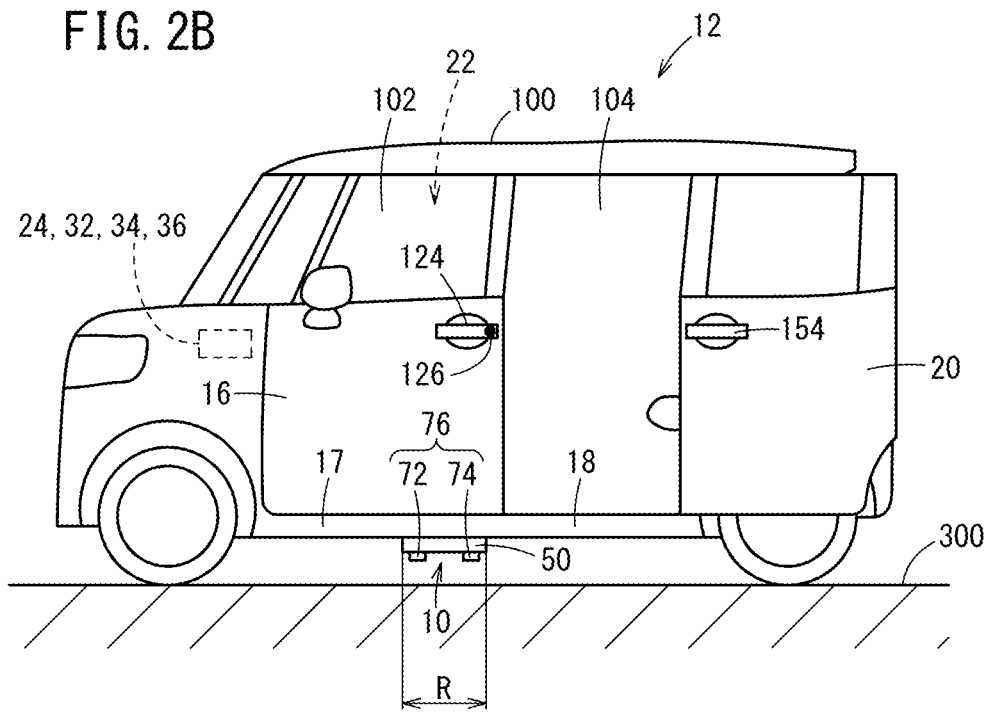

VEHICLE DOOR OPENING/CLOSING DEVICE

CROSS-REFERENCE TO RELATED APPLICATION

This application is based upon and claims the benefit of priority from Japanese Patent Application No. 2017-070110 filed on Mar. 31, 2017, the contents of which are incorporated herein by reference.

BACKGROUND OF THE INVENTION

Field of the Invention

The present invention relates to a vehicle door opening/closing device including a contactless detection unit configured to detect the presence of a user located near a door of a vehicle to thereby bring the door of the vehicle from a locked state to an unlocked state, and thereafter put the door into an opened state or the like, without use of the user's hands.

Description of the Related Art

As one of the detection units that detect the presence of a user standing near a door of a vehicle, for example, Japanese Laid-Open Patent Publication No. 2007-162459 discloses that a laser beam transceiver provided directly below a rear seat door of the vehicle emits a laser beam toward the ground (paragraph [0025] in Japanese Laid-Open Patent Publication No. 2007-162459).

Japanese Laid-Open Patent Publication No. 2007-162459 discloses a hands-free door opening device. According to this device, when the user moves his/her foot so as to intercept the laser beam emitted toward the ground, the foot movement is used as a trigger to bring the rear seat door, which is in a locked and closed state, from a locked state to an unlocked state under the authentication with an electronic key, and thereafter open the rear seat door slightly (referred to as partial opening) (see paragraphs [0025], [0055], and FIG. 9 in Japanese Laid-Open Patent Publication No. 2007-162459).

SUMMARY OF THE INVENTION

In Japanese Laid-Open Patent Publication No. 2007-162459, for example, in a case that, when the rear seat door is open, the user opens the front seat door and then gets into the vehicle and sits on the front seat or then sets down a package on the front seat in the vehicle, i.e., in the case that the rear seat door is in an opened state while the front seat door is also in an opened state, if the user moves his/her foot so as to intercept the laser beam by the foot even though the user has no intention of closing the rear seat door, there is concern that the rear seat door might be mistakenly closed.

As described above, cases may occur in which, even though the user has no intention of closing the door, i.e., even though the user wants to leave the rear seat door open, the rear seat door is accidentally brought from an opened state to a closed state. Such cases give a sense of discomfort to the user, and there is room for improvement.

The present invention has been made in consideration of such a problem, and it is an object of the present invention to provide a vehicle door opening/closing device which enables a user to safely carry out work while leaving the rear seat door open at the time when the presence of a person getting in the front seat or the like is detected.

A vehicle door opening/closing device according to an aspect of the present invention includes: a front-side opening and a rear-side opening formed on a side portion of a vehicle body; a front door configured to open and close the front-side opening; a rear sliding door configured to open and close the rear-side opening; a door driving mechanism configured to automatically open and close the rear sliding door; a detection unit provided at a lower position of the side portion of the vehicle body and configured to detect the presence of a foot of a person in order to open and close the rear sliding door through the door driving mechanism; and a control unit, wherein if the front door is in an opened state at the time when the presence of the foot is detected, the control unit does not put the rear sliding door into a closed state.

According to the present invention, in the case that the rear seat door is in an opened state while the front seat door is also in an opened state, if the detection unit detects the presence of the user, then the rear seat door is maintained in an opened state, not switched to a closed state. Thus, it is possible to avoid a situation in which the rear seat door is accidentally closed even though the user has no intention of closing the rear seat door, and the user can safely carry out work while the rear seat door is left open. Thus, it is possible to prevent a sense of discomfort from being given to the user.

In the vehicle door opening/closing device, the detection unit is preferably disposed under a side sill of the front door.

With the structure, during the loading/unloading work in a state where the rear sliding door is open, it is possible to more reliably prevent the rear sliding door from being unexpectedly closed due to motion of a foot of the user, which is a worker.

According to the present invention, in the case that the rear seat door is in an opened state while the front seat door is also in an opened state, if the detection unit detects the presence of the user, then the rear seat door is maintained in an opened state, not switched to a closed state. Thus, it is possible to avoid a situation in which the rear seat door is accidentally closed even though the user has no intention of closing the rear seat door, and the user can safely carry out work while the rear seat door is left open. Thus, it is possible to prevent a sense of discomfort from being given to the user.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2A is a schematic side view illustrating a state in which, for example, a sliding door is closed, FIG. 2B is a schematic side view illustrating a state in which the sliding door is open;

DESCRIPTION OF THE PREFERRED EMBODIMENTS

A preferred embodiment of a vehicle door opening/closing device according to the present invention will hereinafter be described in detail with reference to the accompanying drawings.

[Configuration]

Figure 1:
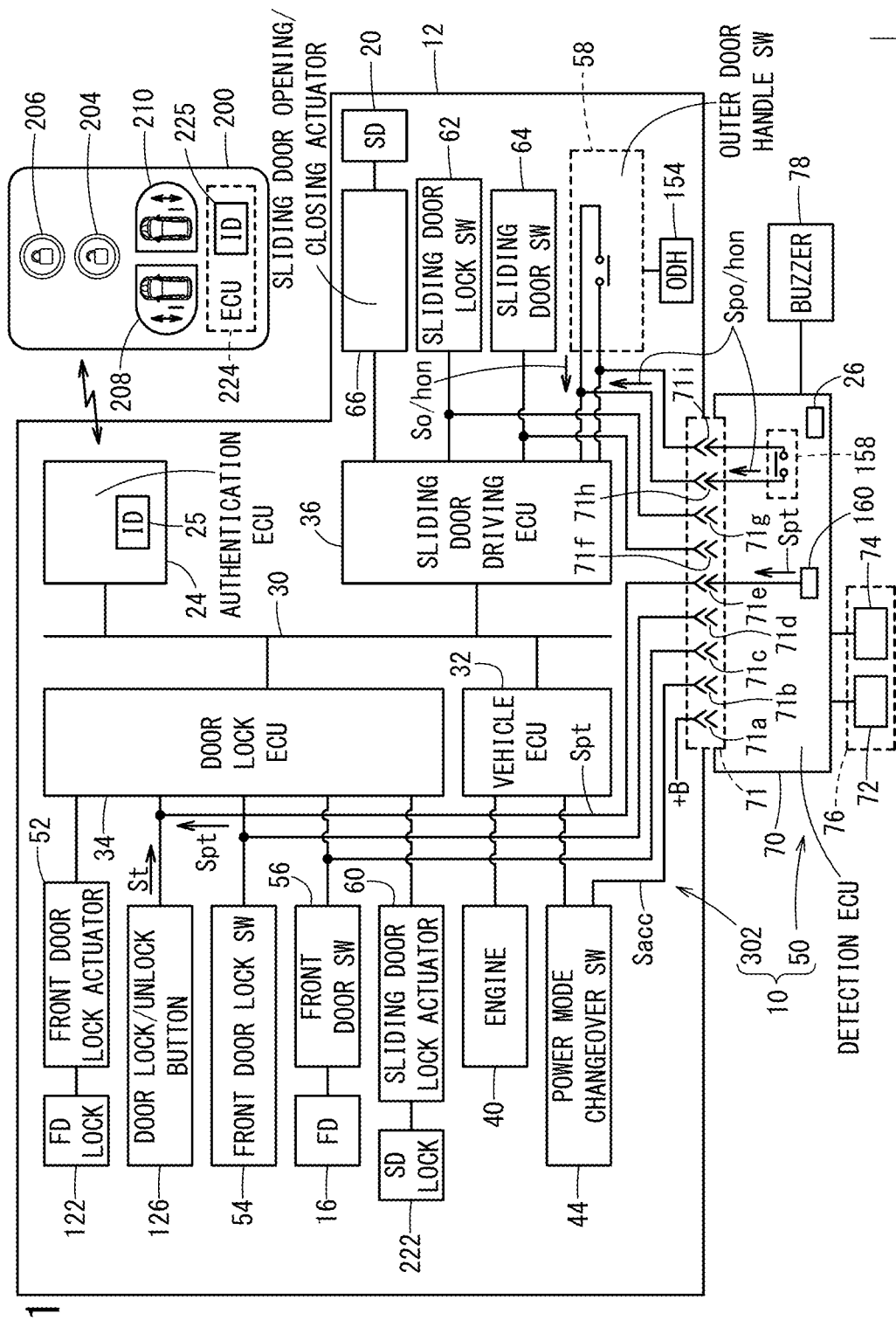
FIG. 1 is a schematic block diagram illustrating a vehicle door opening/closing device according to an embodiment of the present invention.

FIG. 1 is a schematic block diagram illustrating a vehicle door opening/closing device 10 according to this embodiment.

For example, FIG. 2A is a schematic side view illustrating a state in which a sliding door (rear sliding door) 20 on the side of a passenger-side rear seat of a vehicle 12 with the steering wheel on the right side is closed, and FIG. 2B is a schematic side view illustrating a state in which the sliding door 20 of the vehicle 12 is open.

To avoid complication and facilitate understanding, in this embodiment, a configuration and an operation of the vehicle door opening/closing device 10 will be described by citing a front door 16 and the sliding door 20 on a passenger side of the vehicle 12 as an example. However, a configuration and an operation of a front door and a sliding door on the driver side are similar to those on the passenger side, and therefore are also included in the present invention.

As illustrated in FIG. 1, the vehicle door opening/closing device 10 basically includes a vehicle door opening/closing device main body (door driving mechanism) 302 in the vehicle 12, a detection unit 50 that is capable of contactlessly detecting the presence of a user (person), and a mobile device 200 that can be carried by the user.

As illustrated in FIG. 2A and FIG. 2B, the front door 16 of the vehicle 12 is a hinge-type door. The user manually opens and closes the hinge-type door while gripping a door handle 124 of the front door 16 (an outer door handle of the front door 16) to thereby open and close a front left opening (front-side opening) 102 of a vehicle body 100.

On the other hand, the sliding door 20 of the vehicle 12 is a sliding-type door. When the user pulls an outer door handle (hereinafter may be abbreviated as ODH) 154 of the sliding door 20, a rear left opening (rear-side opening) 104 of the vehicle body 100 is opened.

Actually, the sliding door 20 is what is called a power sliding door that is electrically and automatically opened when, under a condition that the sliding door 20 is in a closed state and an unlocked state, a user pulls the outer door handle 154 of the sliding door 20 or the user presses an opening/closing button (APS) 208 of the mobile device 200 which is part of a smart key type entry system.

As will be described in detail below, the sliding door 20 according to this embodiment is controlled so that when the sliding door 20 is in the closed state and in the unlocked state, the sliding door 20 will not open even if the detection unit 50 detects insertion and withdrawal of the user's foot.

The smart key type entry system includes, as illustrated in FIG. 1, an authentication electronic control unit (ECU) (authentication control unit) 24 mounted on the vehicle, and the mobile device 200 carried by the user.

The authentication ECU 24 is a computing device including a micro-computer, and includes a central processing unit (CPU), a storage device (storage unit) 25 such as a ROM (including an EEPROM) or a random access memory (RAM), which is a memory, a timer serving as a time measuring unit (time measurement unit), and if necessary, an input/output device such as an A/D converter or a D/A converter, and the like. By the CPU reading out and executing programs stored in the ROM, the authentication ECU 24 serves as various function realizing unit (function realization unit, function realization means), such as a controller (control unit), a calculator (calculation unit), a processor (processing unit) or the like.

Other ECUs to be described below also have a configuration similar to that of the authentication ECU 24 described above.

The authentication ECU 24 further includes a transmission/reception circuit (not shown) configured to perform wireless authentication communications with the mobile device 200.

The mobile device 200 includes an ECU (mobile device ECU) 224, and this mobile device ECU 224 also serves as an authentication ECU (authentication control unit) of the mobile device 200. A storage device 225 (EEPROM) of the mobile device ECU 224 stores an ID for mutual authentication of the mobile device 200, and the same ID as the ID for the mutual authentication is also stored in advance in the storage device 25 (EEPROM) of the authentication ECU 24 of the vehicle 12.

The mobile device 200 includes an operation unit, which forms part of its external appearance, including an unlocking button (also referred to as unlock button) 204 for the front door 16 and the sliding door 20, a locking button (also referred to as lock button) 206 for the front door 16 and the sliding door 20, an opening/closing button 208 for the sliding door 20 (for the passenger's side), and an opening/closing button 210 (for the driver's side). A user can press the buttons. The mobile device 200 is also provided with, for example, an indicator such as an LED capable of being visually confirmed by the user or the like, and a buzzer and a speaker through which the user can listen to sound or voice, which are not shown.

Inside the mobile device 200, the mobile device ECU (also serving as authentication ECU (authentication control unit)) 224 is provided. The mobile device ECU 224 includes a transmission/reception circuit for performing wireless authentication communications with the authentication ECU 24 in the vehicle.

The unlock button 204, the lock button 206, and the opening/closing buttons 208, 210 are connected electrically to the mobile device ECU 224.

As is well known, as the user carrying the mobile device 200 approaches the front of the front door 16 of the vehicle 12, the smart key entry system is set to an unlock-standby mode for the front door 16 of the vehicle 12 or an unlock-standby mode for the sliding door 20 even though the user does not operate any button of the mobile device 200.

In order to automatically unlock the vehicle door (front door 16 or sliding door 20) in the unlock-standby mode, the user merely walks into a predetermined wireless frequency communication range of the vehicle 12 (mobile device detectable range 80 to be described later, which lies substantially in front of the front door 16) while carrying the mobile device 200 serving as an automatic responder. As a result, the authentication ECU 24 and the mobile device 200 perform authentication communications to determine whether the mutual IDs are the same.

After the authentication communication is successfully completed (i.e., the mutual IDs are the same), for example, if the user presses a door lock/unlock button 126 (door lock sensor) provided to the door handle 124 of the front door 16, then a front door lock 122 and a lock (sliding door lock) 222 of the sliding door 20 are unlocked. Thereafter, when the user pulls the door handle 124, the front door 16 is opened.

On the other hand, the sliding door 20 is automatically opened when the user pulls the outer door handle (ODH) 154 in a state that the sliding door 20 is unlocked, or when the user presses the opening/closing button 208 of the mobile device 200 in a state that the sliding door 20 is locked.

The vehicle door opening/closing device 10 includes, in addition to the authentication ECU 24, a vehicle ECU (vehicle control unit) 32, a door lock ECU (door lock control unit) 34, and a sliding door driving ECU (sliding door driving control unit) 36 which are mutually connected through an in-vehicle communication line 30.

The detection unit 50 of the vehicle door opening/closing device 10 according to this embodiment is commercially available and is mounted as a retrofittable option (as a retrofit option) at a dealer or the like, not at a production factory line for the vehicle 12. However, the detection unit 50 may be mounted at the production factory line.

The detection unit 50 includes, as illustrated in FIG. 1, an ultrasonic sensor 76 including a pair of transducers 72, 74 with the same specification, a buzzer 78, and a detection ECU (detection control unit) 70.

Figure 3:
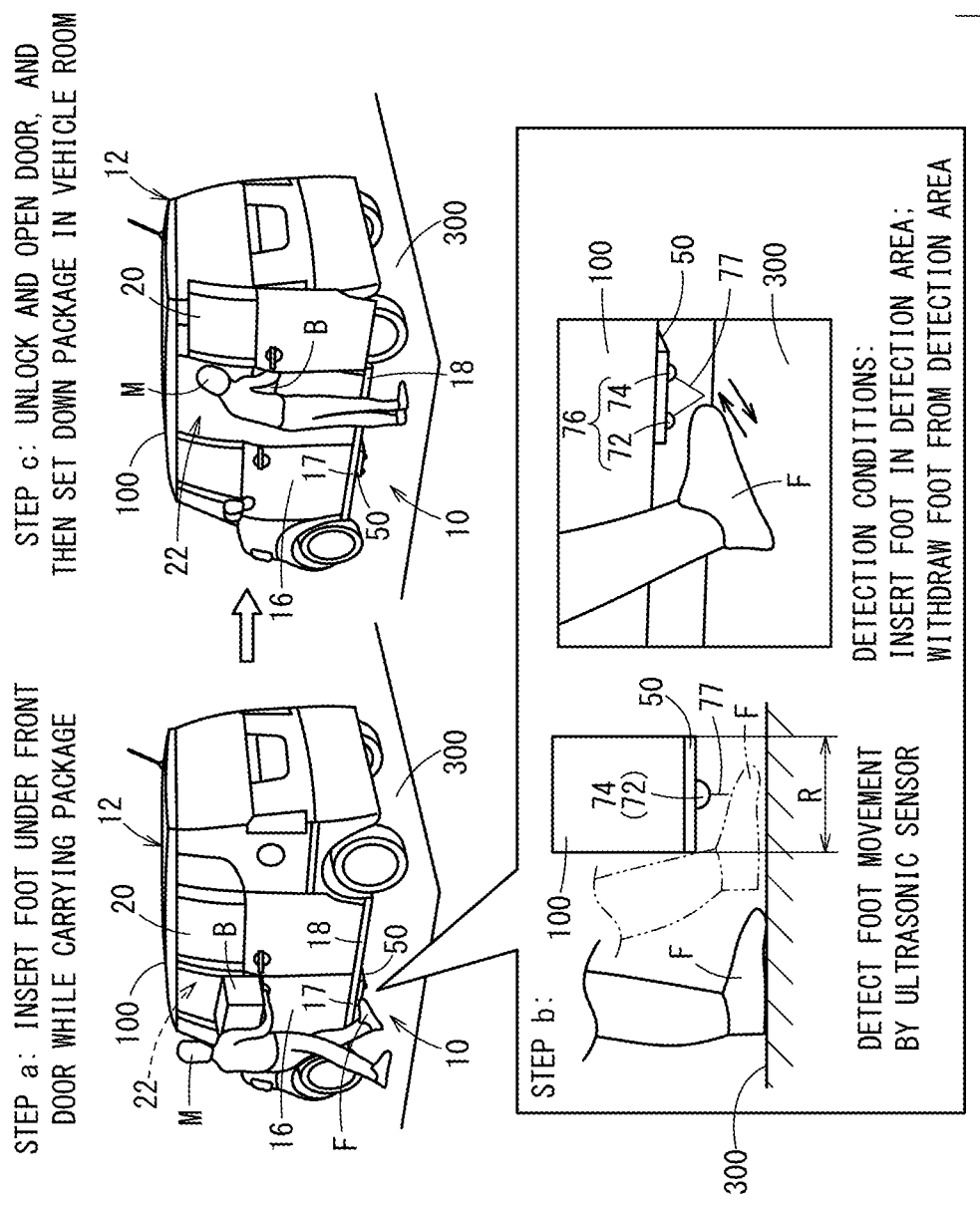
FIG. 3 is an explanatory view of a conceivable scene where a detection unit is used.

The transducers 72, 74 are arranged along a vehicle length direction of the vehicle 12 as illustrated in FIG. 2A, FIG. 2B, and FIG. 3. The transducers 72, 74 are of a two-way type (transmittable and receivable) configured so as to switch between transmission and reception of ultrasonic waves at a predetermined period (for example, every several hundred milliseconds). The transducers 72, 74 are advantageous in having a longer usable period than a device for transmission only or a device for reception only. In these drawings, reference sign R denotes a detection range (detection area) within the ultrasonic sensor 76 can detect a signal.

The detection unit 50 is electrically connected to the vehicle door opening/closing device main body 302 in the vehicle 12 with a wire through a connector 71. In addition, as illustrated in FIG. 2A and FIG. 2B, the detection unit 50 is fixed, with a fastening member (not shown), to the vehicle body 100 on a lower side of the front door 16 (under a front side sill 17) near a lower side of the sliding door 20 (rear side sill 18) so that insertion and withdrawal of the left foot F of a user M under the vehicle can be easily detected.

FIG. 3 is an explanatory view of a conceivable scene where the detection unit 50 is used. The detailed operation related to the detection unit 50 will be described later.

For example, in a state that the front door 16 and the sliding door 20 of the vehicle 12 parked on a ground 300 are locked, the user M who carries the mobile device 200 in his/her pocket of the clothes, etc., and holds a package B with his/her arms inserts his/her left foot F into a gap under the vehicle body so as to place the foot F under the ultrasonic sensor 76 (i.e., within a predetermined detection range R) mounted on the lower side of the front door 16 (under the front side sill 17) (step a).

Next, the user M withdraws his/her left foot F from under the ultrasonic sensor 76 (from the predetermined detection range R between the ultrasonic sensor 76 and the ground 300) within several seconds. The detection of the inserting and withdrawing motion of the left foot F {referred to as kicking operation (kick motion)} triggers the start of authentication communication between the mobile device 200 (the mobile device ECU 224 of the mobile device 200) and the authentication ECU 24 (step b).

In fact, the detection of the inserting and withdrawing motion of the left foot F or the like by the ultrasonic sensor 76 is performed as follows. Initially, an ultrasonic wave 77 (transmission wave) transmitted from one transducer 72 is reflected from the ground 300. By the inserting and withdrawing motion of the left foot F, this reflection from the ground 300 is changed into a reflection from the left foot F or the like, and thereafter the reflection from the left foot F is returned to the reflection from the ground 300. Whether this process has occurred within several seconds (predetermined time) is determined by monitoring a state (return-back time) of the ultrasonic wave 77 (reflected wave) with the other transducer 74.

After the authentication in step b is successfully completed, the front door 16 and the sliding door 20 are changed from the locked state to the unlocked state so that the sliding door 20 is automatically opened.

The user M with the package B in his/her arms can set the package B down in a vehicle room 22 to load the vehicle 12 with the package B (step c).

After setting the package B down in the vehicle room 22, the user M who has determined that the loading of the package B is completed performs the aforementioned kick motion (with either right foot or left foot F) (step b again).

Detection of this kick motion triggers the automatic closing of the sliding door 20. After that, the authentication communication between the mobile device 200 (mobile device ECU 224 of the mobile device 200) and the authentication ECU 24 is performed and if the authentication is successfully completed, the sliding door 20 is locked. At this time, all the doors including the front door 16 are locked.

In this case, the detection unit 50 (ultrasonic sensor 76) is provided under the front door 16 (under the front side sill 17). Therefore, even if the foot (left foot F or right foot) of the user M is placed under the rear side sill 18 (under the rear left opening 104) during the loading/unloading work of the package B, the foot is out of the detection range R of the ultrasonic sensor 76, and thus the sliding door 20 is kept open. Therefore, it is possible to eliminate the concern that the sliding door 20 might be closed against the user's will while the user is loading or unloading the package B, and thus the load and unload work for the package B can be performed smoothly.

Back to FIG. 1, an engine 40 as a motive power source of the vehicle 12 and a power mode changeover switch 44 that can switch a power mode under the authentication with the mobile device 200 located within the predetermined range from the vehicle room 22 are connected to the vehicle ECU 32. The power mode changeover switch 44 approximately corresponds to a conventional ignition switch. The motive power source of the vehicle 12 may be a fuel cell instead of the engine 40.

Figure 4:
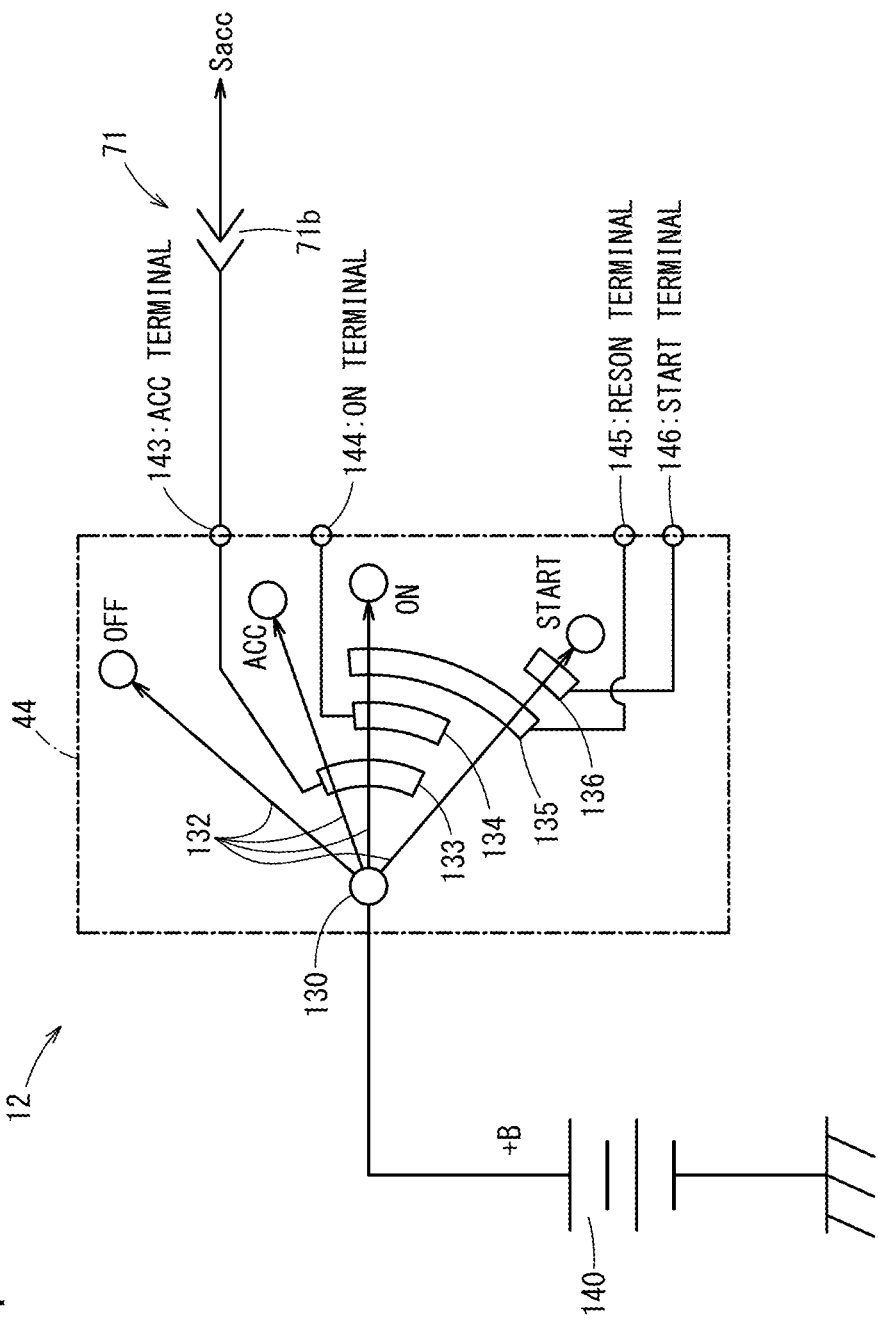
FIG. 4 is an explanatory view of a circuit configuration of a power mode changeover switch.

FIG. 4 is an explanatory view of a circuit configuration of the power mode changeover switch 44 (power mode changeover button) that is disposed on an instrument panel that is not shown. An actual circuit includes a relay whose switching position of a movable contact is arbitrarily selectable; however, in order to facilitate understanding, description will be made of a circuit configuration of a rotary switch with a function of a conventional ignition switch.

The power mode changeover switch 44 is a press button switch, and every time the button is pressed, function modes can be alternatively selected (switched) in the following order repeatedly: an off mode (in which all the electric power sources are off, and which is also referred to as OFF mode)→an accessory mode (a mode in which in-vehicle electric components such as an audio system can be used, and this mode is also referred to as ACC mode (ACCESSORY mode))→an on mode (also referred to as ON mode) in which the vehicle is in operation, wherein the on mode is effected after a start mode (START mode) for starting up the engine 40 (START)→the off mode.

The power mode changeover switch 44 includes a common terminal 130, one movable contact 132, fixed contacts OFF, ACC, ON, and START, and sections 133, 134, 135, 136. To the section 133, an ACC terminal (ACCESSORY terminal) 143 is connected, and to the section 134, an ON terminal 144 is connected. To the section 135, a remote engine start (RES: which is related to a remote control engine starter) ON terminal 145 is connected, and to the section 136, a START terminal 146 is connected.

When the movable contact 132 is at the fixed contact OFF, the voltage (also referred to as electric power +B or electric energy +B) of an energy storage unit (e.g., battery) 140 mounted in the vehicle is not connected to the electric components or the like.

When the movable contact 132 is at the fixed contact ACC, the electric power +B is supplied from the common terminal 130 to the ACC terminal 143 through the movable contact 132 and the section 133. To the ACC terminal 143, in addition to the in-vehicle electric components (not shown), a terminal 71*b* of a connector 71 of the detection unit 50 is connected through a wire. A signal of the voltage at the ACC terminal 143 is called an ACC signal Sacc. When the ACC terminal 143 is connected to the energy storage unit 140 through the section 133, the movable contact 132, and the common terminal 130, the ACC signal Sacc has the voltage of the electric power +B (the voltage is also referred to as +B) of a nominal value of +12 [V] (high level). When the section 133 is not connected to the movable contact 132, the ACC signal Sacc is grounded through a resistor (not shown) and has a voltage 0 [V] (low level).

When the movable contact 132 is at the fixed contact ON, the electric power +B is supplied to the ON terminal 144 through the section 134, and the electric power +B is also supplied to the ACC terminal 143 through the section 133 and moreover the electric power +B is supplied to a RESON terminal 145 through the section 135. When the sections 134, 135 are not connected to the movable contact 132, the sections 134, 135 are grounded through a resistor (not shown) via the ON terminal 144 and the RESON terminal 145, and the voltages of the sections 134, 135 become 0 [V].

When the movable contact 132 is at the fixed contact START, the electric power +B is supplied to the RESON terminal 145 through the section 135, and the electric power +B is supplied to the START terminal 146 through the section 136. When the section 136 is not connected to the movable contact 132, the section 136 is grounded through a resistor (not shown) via the START terminal 146, so that the voltage is 0 [V].

Here, the following three points should be noted.

First, in a case that the power mode changeover switch 44 is pressed within the vehicle room 22, when the authentication communication with the mobile device 200 located within the vehicle room 22 is successfully completed so that the movable contact 132 is connected to the fixed contact START, the engine 40 is cranked by an unillustrated cranking motor to thereby be started up, and thereafter the movable contact 132 is returned to the fixed contact ON by the vehicle ECU 32. Note that during the operation after the start-up of the engine 40, the supply of electric power to the cranking motor is stopped.

Secondly, in a case that the engine start button of the unillustrated remote control engine starter is pressed outside the vehicle 12, when the authentication communication with the remote control engine starter is successfully completed, the vehicle ECU 32 takes control so as to move the movable contact 132 from the position of the fixed contact OFF to the fixed contact START while avoiding the fixed contact ACC (ACCESSORY) and the fixed contact ON, and then connect the movable contact 132 directly to the fixed contact START. Thus, the engine 40 is cranked and started up, and thereafter the movable contact 132 is maintained at the fixed contact START. Note that during the operation after the engine 40 has been started up, the supply of electric power to the cranking motor is stopped.

Thirdly, in a case where the engine 40 is started up by using the remote control engine starter from the outside and the engine 40 is placed in the operation state, for example, if the unlock button 204 of the mobile device 200 is operated from outside the vehicle, and the locks 122, 222 are unlocked after the successful authentication communication, then the vehicle ECU 32 switches the connection of the movable contact 132 from the fixed contact START to the fixed contact OFF, and stops the engine 40.

Back to FIG. 1, the door lock ECU 34 is connected to a front door lock actuator 52 that locks and unlocks the lock 122 of the front door 16 (front door lock, FD lock), a door lock/unlock button 126, a front door lock switch 54 that detects a state of the front door lock 122 (whether the front door lock 122 is in a locked state or an unlocked state), a front door switch 56 that detects the opened/closed state of the front door (FD) 16, and a sliding door lock actuator 60 that locks and unlocks the lock 222 of the sliding door 20 (SD lock).

The door lock/unlock button 126 incorporated in the door handle 124 (see FIG. 2A, FIG. 2B), when pressed, outputs a door lock trigger signal St. When the front door 16 and the sliding door 20 are in the locked state, the door lock trigger signal St serves as an unlock signal for the front door 16 and the sliding door 20. When the front door 16 and the sliding door 20 are in the closed and unlocked state, the door lock trigger signal St serves as a lock signal for the front door 16 and the sliding door 20.

To the sliding door driving ECU 36, there are connected an outer door handle switch 58, a sliding door lock switch 62, a sliding door switch 64, and a sliding door opening/closing actuator 66. The outer door handle switch 58 causes the closed state and outputs an outer door handle switch on signal So/hon when the user M pulls the outer door handle 154 (see FIG. 2A, FIG. 2B) by hand (when the outer door handle 154 is not pulled, the opened state is established and the outer door handle switch on signal So/hon is not output). The sliding door lock switch 62 detects a state of the lock 222 of the sliding door 20 (SD lock) (whether the lock 222 is in a locked state or an unlocked state). The sliding door switch 64 detects an opened/closed state of the sliding door 20. The sliding door opening/closing actuator 66 operates to open or close the sliding door (SD) 20.

The detection ECU 70 includes a timer 26 as a time measuring unit, and is connected to the ultrasonic sensor 76 including the transducers 72 and 74, the buzzer 78, and the connector 71 as an electric component for electrically connecting wires to each other. The connector 71 includes nine terminals 71*a* to 71*i*.

The terminal 71a is a terminal through which the electric power +B is supplied from the energy storage unit 140 mounted in the vehicle 12 to the detection unit 50.

The terminal 71b is connected to the ACC terminal 143 (see FIG. 4), and is used to detect, by the detection ECU 70, the voltage (electric power +B or 0 [V]) of the ACC terminal 143 on the basis of the voltage level of the ACC signal Sacc, and based on the detected voltage, place the detection unit 50 in a kick detection mode state (kick detectable state) or a kick detection prohibition mode state.

The terminal 71c is connected to the front door switch 56 and is used to detect the opened/closed state of the front door 16 by the detection ECU 70.

The terminal 71d is connected to the front door lock switch 54 and is used to detect the locked/unlocked state of the front door 16 by the detection ECU 70.

The terminal 71e is connected to the door lock/unlock button 126. A quasi door lock trigger signal Spt, which is equivalent to the door lock trigger signal St, is output from the detection ECU 70 through the terminal 71e. The terminal 71e is connected to a generation unit 160 that generates the quasi door lock trigger signal Spt in the detection ECU 70.

The terminal 71f is connected to the sliding door switch 64 and is used to detect the opened/closed state of the sliding door 20 by the detection ECU 70.

The terminal 71g is connected to the sliding door lock switch 62, and is used to detect the locked/unlocked state of the lock 222 of the sliding door 20 by the detection ECU 70.

The terminals 71h, 71i are connected to an outer door handle switch (ODH switch) 158 in the detection ECU 70. The ODH switch 158 has a function equivalent to the function of the outer door handle switch 58 described above, and is an electronic switch famed of a semiconductor element. The outer door handle switch 158 functions as a generation unit that generates and outputs a quasi outer door handle switch on signal (quasi ODH switch on signal) Spo/hon when the outer door handle switch 158 is turned on by the detection ECU 70 under a predetermined condition to be described later.

This quasi outer door handle switch on signal Spo/hon is a quasi signal equivalent to the outer door handle switch on signal So/hon output from the outer door handle switch 58 (see FIG. 1) when the user M pulls the outer door handle 154 (see FIG. 2A, FIG. 2B) by hand.

[Operation]

Figure 5:
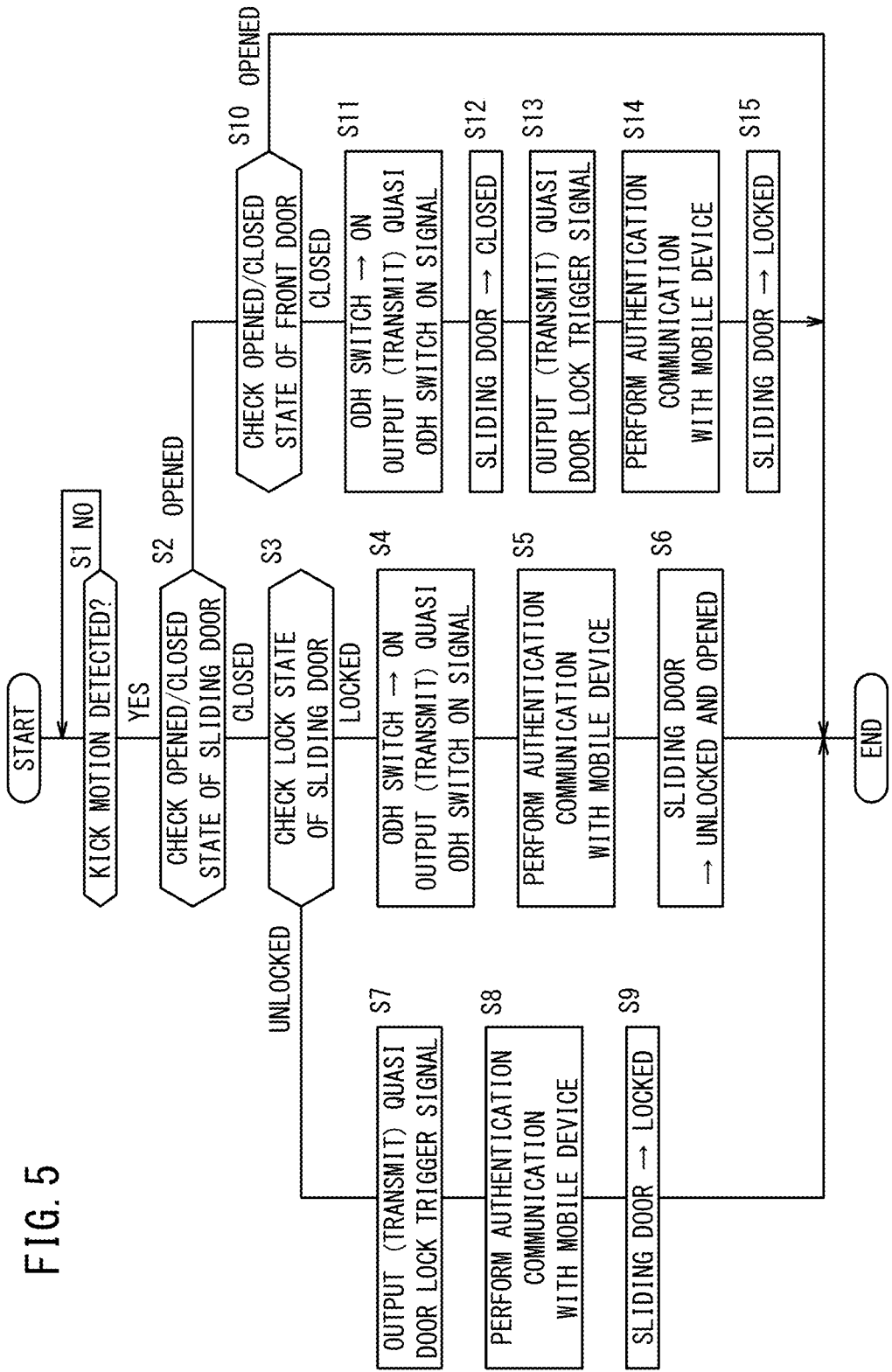
FIG. 5 is a flowchart for specifically describing an operation of a vehicle door opening/closing device.
Figure 6:
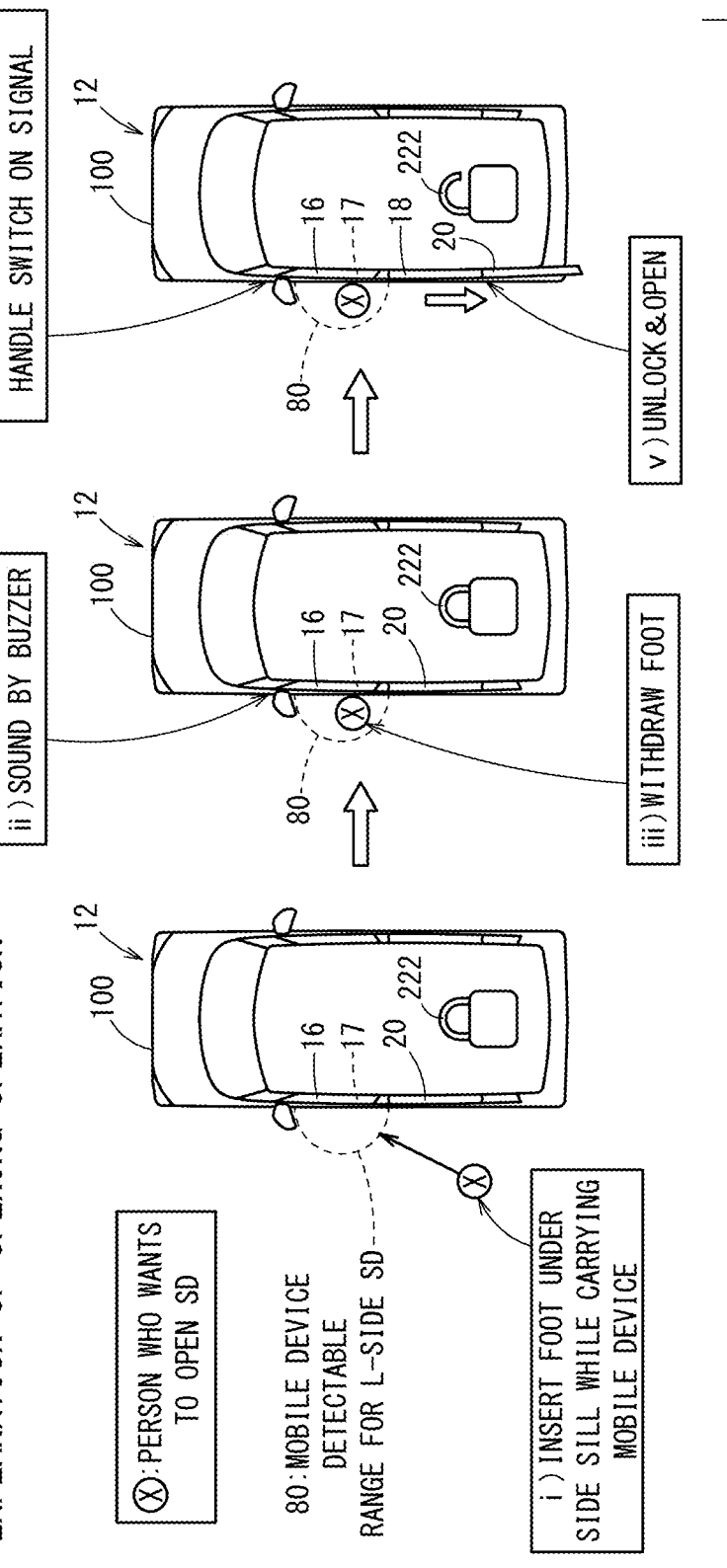
FIG. 6 is a diagram for describing an operation when the sliding door is changed from a locked state to an unlocked and opened state.
Figure 7:
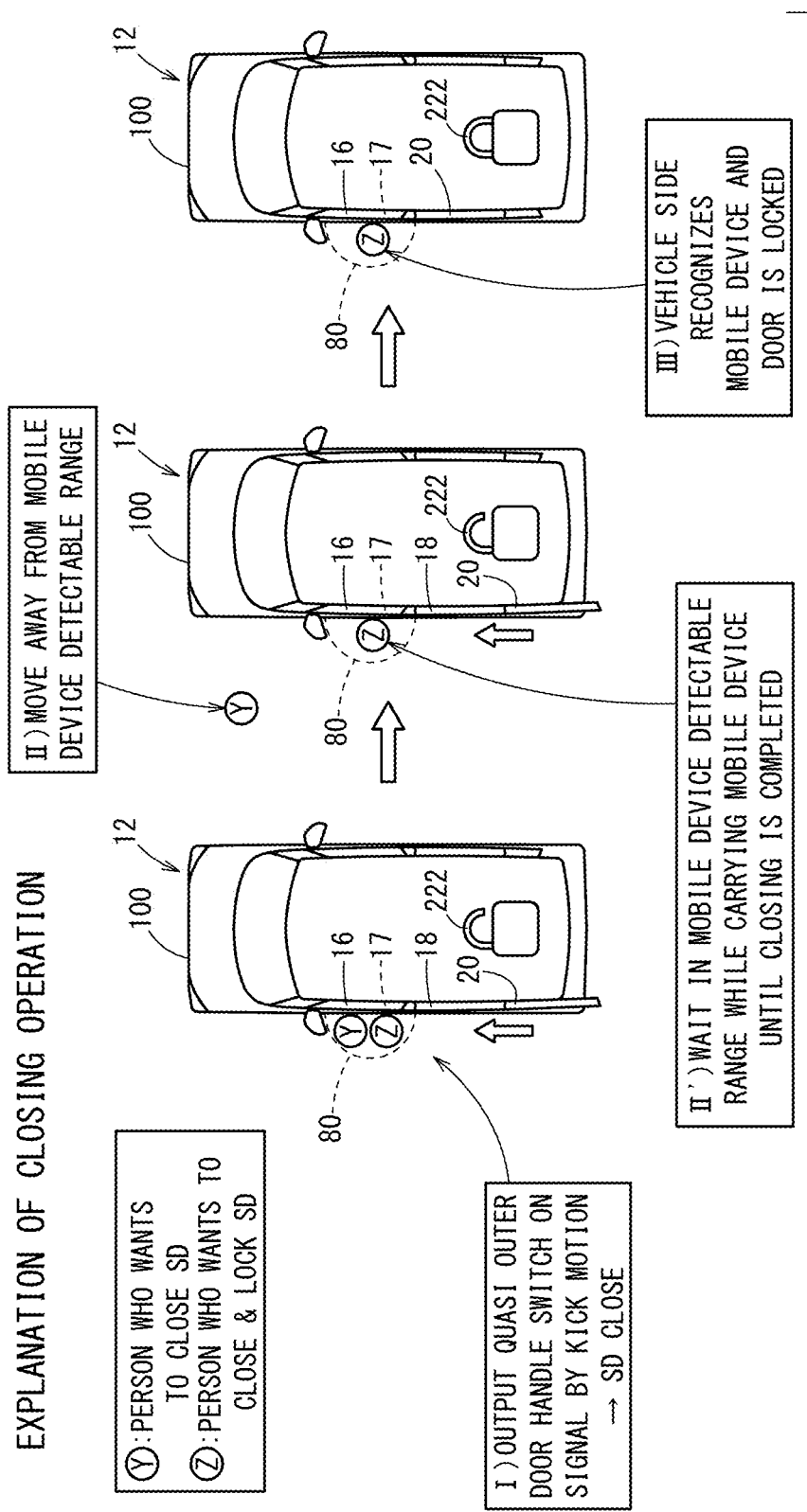
FIG. 7 is a diagram for describing an operation when the sliding door is changed from an opened state to a closed state and when the sliding door is changed from the opened state to a closed and locked state.
Figure 8:
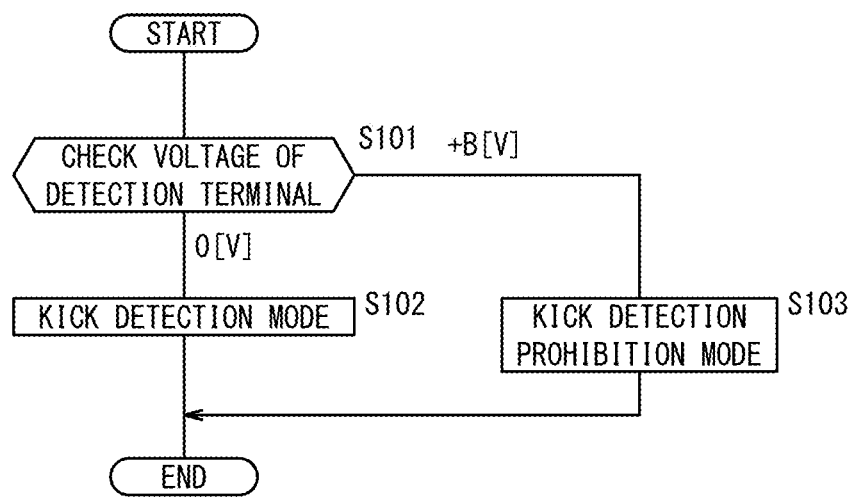
FIG. 8 is a flowchart for describing an operation of the detection unit.

Next, a detailed operation of the vehicle door opening/closing device 10 that is basically configured and operated as above is described with reference to FIG. 5, FIG. 6, FIG. 7, and FIG. 8 in the order of the following (1) to (4). FIG. 5 is a flowchart of an operation (opening/closing operation and lock/unlock operation) of the sliding door 20 that is performed in cooperation with the detection unit 50 and the vehicle door opening/closing device main body 302. FIG. 6 is a diagram for describing an operation performed when the sliding door 20 (SD) transitions from the locked (LOCK) state to the unlocked (UNLOCK) and opened (OPEN) state. FIG. 7 is a diagram for describing an operation performed when the sliding door 20 transitions from the opened (OPEN) state to the closed (CLOSE) state and when the sliding door 20 transitions from the opened (OPEN) state to the closed (CLOSE) and locked (&LOCK) state. FIG. 8 is a flowchart in which it is determined whether the detection unit 50 should be in operation or in non-operation.

(1) Process for transition of the sliding door from the closed and locked state to the opened and unlocked state;
(2) Process for transition of the sliding door from the closed and unlocked state to the closed and locked state;
(3) Process for transition of the sliding door from the opened and unlocked state to the closed and locked state; and
(4) Process of determining the operation or the non-operation of the detection unit 50.

[Operation of Sliding Door 20 in Cooperation with Detection Unit 50 and Vehicle Door Opening/Closing Device Main Body 302]

<(1) Process for Transition of Sliding Door from Closed and Locked State to Opened and Unlocked State>

In step S1, the detection ECU 70 determines whether detection of kicking has occurred (whether the kick motion has been detected).

As illustrated in FIG. 6, in the kick detection, the kick motion is detected when: within the mobile device detectable range 80 of the sliding door 20 (L-side SD), i) a person X who wants to open the sliding door 20 (SD) inserts his/her foot (right foot or left foot F) under the ultrasonic sensor 76 located under the front side sill 17 while carrying the mobile device 200; ii) the detection unit 50 causes the buzzer 78 to produce sound; and iii) the person X withdraws his/her foot from under the ultrasonic sensor within several seconds (step S1: YES). Note that, in this embodiment, the mobile device detectable range 80 of the sliding door 20 is provided substantially in front of the front door 16.

Next, in step S2, the detection ECU 70 acquires a detection result concerning the opened/closed state of the sliding door switch 64 through the terminal 71f, and determines whether the sliding door 20 is in the opened or closed state.

Here, suppose that the sliding door 20 is in the closed state (step S2: closed).

Next, in step S3, the detection ECU 70 acquires a detection result concerning the locked/unlocked state of the sliding door lock switch 62 through the terminal 71g and detects the locked/unlocked state of the sliding door 20.

Here, suppose that the sliding door 20 is in the locked state (step S3: locked).

In this case, the detection ECU 70 turns on (ON) the outer door handle switch 158 in step S4. Thus, from the terminals 71h, 71i of the detection ECU 70 connected to the outer door handle switch 158 of the detection unit 50, iv) the quasi outer door handle switch on signal Spo/hon is output and is then input to the sliding door driving ECU 36.

Next, in step S5, upon input of the quasi outer door handle switch on signal Spo/hon, an authentication request from the sliding door driving ECU 36 is transmitted to the authentication ECU 24 through the in-vehicle communication line 30 (hereinafter the description of the in-vehicle communication line 30 is omitted), and the authentication ECU 24 having received the quasi outer door handle switch on signal Spo/hon performs the authentication communication with the mobile device 200. In this case, when the IDs stored in the respective storage devices 25, 225 agree with each other, the authentication is successfully completed, and the result of the successful authentication from the authentication ECU 24 is notified to the sliding door driving ECU 36.

At this time, in step S6, v) the sliding door driving ECU 36 unlocks the lock 222 by the sliding door lock actuator 60 through the door lock ECU 34 and thereafter puts the sliding door 20 into the opened state through the sliding door opening/closing actuator 66 (see the right-hand side in FIG. 6).

The aforementioned process {step S1: YES→step S2: closed→step S3: locked→step S4: Spo/hon signal output→step S5: authentication communication→step S6: open} corresponds to a process (referred to as a first route process)

to bring the sliding door 20 from the closed and locked state to the unlocked and opened state when the user X performs the kick motion.

<(2) Process for Transition of Sliding Door from Closed and Unlocked State to Closed and Locked State>

On the other hand, in step S3 described above, in the case that the detection ECU 70 determines that the currently-closed sliding door 20 is in the unlocked state, even though the first kick motion is performed in step S1, the sliding door 20 will not open immediately.

Therefore, in step S7, the detection ECU 70 outputs the quasi door lock trigger signal Spt from the generation unit 160 through the terminal 71e, and transmits the signal to the door lock ECU 34.

Next, in step S8, upon input of the quasi door lock trigger signal Spt, the authentication request from the door lock ECU 34 is transmitted to the authentication ECU 24. At this time, the authentication ECU 24 performs the authentication communication with the mobile device 200. In this case, if the IDs stored in the respective storage devices 25, 225 agree with each other, the authentication is successfully completed, and the result of the successful authentication from the authentication ECU 24 is notified to the door lock ECU 34.

Next, in step S9, the door lock ECU 34 locks the lock 222 through the sliding door lock actuator 60 on the basis of the result of the successful authentication.

The aforementioned process {step S1: YES→step S2: closed→step S3: unlocked→step S7: Spt signal output-→step S8: authentication communication→step S9: locked} corresponds to a process (referred to as a second route process) to cause the sliding door 20 that is closed and unlocked to be locked by the kick motion performed by the user X.

If the kick motion is detected again in step S1 (the second kick motion) after step S9, the sliding door 20 transitions from the closed and locked state to the unlocked and opened state according to the aforementioned first route process.

<(3) Process for Transition of Sliding Door from Opened and Unlocked State to Closed and Locked State>

In step S1, the detection ECU 70 determines whether detection of kicking has occurred (whether the kick motion has been detected).

As illustrated in FIG. 7, it is deter lined that the kick motion has been detected when, within the mobile device detectable range 80 of the sliding door 20 (L-side SD), a person Y who wants to close (CLOSE) the sliding door 20 (SD) or a person Z who wants to close and lock (CLOSE & LOCK) the sliding door 20 performs the following operation I): the person Y or the person Z carrying the mobile device 200 inserts and withdraws his/her foot (right foot or left foot F) under the ultrasonic sensor 76 located under the front side sill 17 (performs the kick motion) (step S1: YES). In this case, the detection unit 50 causes the buzzer 78 to produce sound.

Next, if it is determined that the sliding door 20 is in the opened state (the lock 222 is unlocked, of course) on the basis of a detection result concerning the opened/closed state of the sliding door switch 64 by the detection ECU 70 in step S2, the detection ECU 70 acquires and detects the opened/closed state of the front door 16 (detection result concerning the opened/closed state of the front door switch 56) through the terminal 71c in step S10.

Suppose that the front door is in "a closed state" (step S10: closed).

In this case, the detection ECU 70 turns on (ON) the outer door handle switch 158 in step S11. Thus, I) the quasi outer door handle switch on signal Spo/hon is output from the outer door handle switch 158, and then input to the sliding door driving ECU 36.

Next, in step S12, the sliding door driving ECU 36 puts the sliding door 20 into the closed state by using the sliding door opening/closing actuator 66.

II) The person Y who wants to close (CLOSE) the sliding door 20 (SD) moves outward from the mobile device detectable range 80 while carrying the mobile device 200, before the process for placing the sliding door 20 in the closed state is completed.

On the other hand, II') the person Z who wants to close and lock the sliding door 20 waits in the mobile device detectable range 80 while carrying the mobile device 200, until the sliding door 20 is closed (CLOSE operation is completed).

When the detection ECU 70 detects that the sliding door 20 is closed based on the state of the sliding door switch 64, the detection ECU 70 outputs the quasi door lock trigger signal Spt from the generation unit 160 and transmits the signal to the door lock ECU 34 in step S13 in a manner similar to the processes in steps S7, S8, S9 described above.

Next, in step S14, the authentication request of the door lock ECU 34 is transmitted to the authentication ECU 24 and the authentication ECU 24 performs the authentication communication with the mobile device 200. When the IDs stored in the respective storage devices 25 and 225 agree with each other, the authentication is successfully completed, and the result of the successful authentication from the authentication ECU 24 is notified to the door lock ECU 34.

At this time, in step S15, the door lock ECU 34 locks the lock 222 through the sliding door lock actuator 60.

The aforementioned process {step S1: YES→step S2: opened→step S10: closed→step S11: Spo/hon signal output→step S12: sliding door closed→step S13: Spt signal output→step S14 authentication communication→step S15: locked} corresponds to a process (referred to as a third route process) to bring the sliding door 20 from the opened and unlocked state to the closed and locked state when the user Z performs the kick motion.

Even if the detection unit 50 is retrofitted as a retrofit option, the security is maintained in any of the first to third route processes because the sliding door 20 can be opened/closed and locked/unlocked under the existing authentication communication between the mobile device 200 and the authentication ECU 24 (steps S5, S8, S14).

When it is determined in step S10 that the front door 16 (detection result concerning the opened/closed state of the front door switch 56) is in "an opened state", the process for opening/closing and locking/unlocking the sliding door 20 is put to an end without performing any further processes.

That is, when it is determined in step S10 that the front door 16 (detection result concerning the opened/closed state of the front door switch 56) is in "an opened state", the detection ECU 70 does not switch the outer door handle switch 158 to an ON state, and maintains it in an OFF state. As a result, the quasi outer door handle switch on signal Spo/hon is not output from the outer door handle switch 158, while the quasi outer door handle switch on signal Spo/hon is not input to the sliding door driving ECU 36. Thus, the sliding door 20 is not put into a closed state, and is maintained in an opened state (the lock 222 is in an unlocked state, of course).

The aforementioned process {step S1: YES→step S2: opened→step S10: opened→END} corresponds to a process (referred to as a fourth route process) to maintain the opened and unlocked sliding door 20 in an opened state (the lock 222 is in an unlocked state, of course), not switch the door 20 to an closed state, if the front door 16 is in an opened state (and also in an unlocked state, of course) at the time when the detection unit 50 detects the kick motion of the user Z.

<(4) Process of Determining Operation or Non-Operation of Detection Unit 50>

Next, in step S101 in FIG. 8, the detection ECU 70 detects the ACC signal Sacc through the terminal 71b, which is a detection terminal, and checks the voltage. If Sacc=+B, it is determined that connection of the movable contact 132 of the power mode changeover switch 44 has been switched to the fixed contact ACC or the fixed contact ON in the vehicle 12, and thus it is determined that there is an occupant in the vehicle 12. Then, the kick detection prohibition mode is set (kick motion is disabled) in step S103.

On the other hand, if the ACC signal Sacc is 0 [V], connection of the movable contact 132 has been switched to the fixed contact OFF or the fixed contact START, and thus it is determined that no occupant is in the vehicle 12. Then, the kick detection mode is set (kick motion is enabled) in step S102.

SUMMARY AND MODIFICATIONS

The vehicle door opening/closing device 10 according to the aforementioned embodiment includes: a front left opening 102 and a rear left opening 104 famed on a side portion of a vehicle body 100; a front door 16 configured to open and close the front left opening 102; a rear sliding door 20 configured to open and close the rear left opening 104; a vehicle door opening/closing device main body 302 configured to automatically open and close the rear sliding door 20; a detection unit 50 provided at a lower position of the side portion of the vehicle body 100 and configured to detect the presence of a foot (left foot F or right foot) of a user M in order to open and close the rear sliding door 20 through the vehicle door opening/closing device main body 302; and a control unit (detection ECU 70, door lock ECU 34, sliding door driving ECU 36), wherein if the front door 16 is in an opened state (step S10: opened) at the time when the detection unit 50 detects the presence of the foot (left foot F or right foot) (step S1: YES), the control unit 70, 34, 36 does not put the rear sliding door 20 into a closed state.

According to the present embodiment, when the sliding door 20 is in an opened state, in a case that the user opens the front seat door and then gets in the front seat of the vehicle or then sets down a package on the front seat, that is, in the case that the rear seat door (sliding door 20) is in an opened state while the front seat door (front door 16) is also in an opened state, if the detection unit 50 detects the presence of the user M, then the rear seat door (sliding door 20) is maintained in an opened state, not switched to a closed state. Thus, it is possible to avoid a situation in which the rear seat door (sliding door 20) is accidentally closed even though the user has no intention of closing the rear seat door (sliding door 20), and the user can safely carry out work while the rear seat door is left open. Thus, it is possible to prevent a sense of discomfort from being given to the user.

In the vehicle door opening/closing device 10 according to the above embodiment, the detection unit 50 (ultrasonic sensor 76) is disposed under the front door 16 (under the front side sill 17).

With the structure, during the loading/unloading work in a state where the rear sliding door 20 is open, it is possible to prevent the rear sliding door 20 from being unexpectedly closed due to motion of a foot (left foot F or right foot) of the user M, which is a worker.

Even if the detection unit 50 is a retrofit option, the rear seat door (sliding door 20) can be put into an opened state under authentication communication by cooperation of the existing door driving unit (door lock ECU 34 and sliding door driving ECU 36) and the mobile device 200.

The present invention is also applicable to a case in which a vehicle travels on the right side of the road.

The present invention is not limited to the above embodiment, and various configurations can be employed on the basis of the description of the present specification.

What is claimed is:

1. A vehicle door opening/closing device comprising:
   a front-side opening and a rear-side opening formed on a side portion of a vehicle body;
   a front door configured to open and close the front-side opening;
   a rear sliding door configured to open and close the rear-side opening;
   a door driving mechanism configured to automatically open and close the rear sliding door;
   a detection unit provided at a lower position of the side portion of the vehicle body and configured to detect a presence of a foot of a person in order to open and close the rear sliding door through the door driving mechanism; and
   a control unit configured to output a signal for driving the rear slide door toward a closed state at a time when the presence of the foot is detected, and keep the rear slide door in an open state without outputting the signal for driving the rear slide door toward the closed state at a time when the front door and the rear slide door are in the open state.

2. The vehicle door opening/closing device according to claim 1, wherein:
   the detection unit is disposed under a side sill of the front door.

* * * * *